US006336655B1

(12) United States Patent
Reh et al.

(10) Patent No.: US 6,336,655 B1
(45) Date of Patent: Jan. 8, 2002

(54) ARRAY FOR ACTIVATING THE HORN IN BUILT-IN MODULAR STEERING WHEELS

(75) Inventors: Stefan Reh, Wörth; Konrad Sauer, Aschaffenburg, both of (DE)

(73) Assignee: Petri AG, Aschaffenburg (DE)

( * ) Notice: Subject to any disclaimer, the term of this patent is extended or adjusted under 35 U.S.C. 154(b) by 0 days.

(21) Appl. No.: 09/367,767

(22) PCT Filed: Mar. 2, 1998

(86) PCT No.: PCT/DE98/00666

§ 371 Date: Aug. 19, 1999

§ 102(e) Date: Aug. 19, 1999

(87) PCT Pub. No.: WO98/42544

PCT Pub. Date: Oct. 1, 1998

(30) Foreign Application Priority Data

Mar. 21, 1997 (DE) .......................................... 197 14 169

(51) Int. Cl.[7] .............................................. B60R 21/16
(52) U.S. Cl. .................................... 280/731; 280/728.2
(58) Field of Search .............................. 280/731, 728.1, 280/728.2, 728.3; 74/552

(56) References Cited

U.S. PATENT DOCUMENTS 5,709,401 A * 1/1998 Schenck .................. 280/728.2
5,727,811 A * 3/1998 Nagata et al. ............... 280/731
5,741,025 A * 4/1998 Meyer et al. ................ 280/731
5,887,892 A 3/1999 Burdack et al. ............. 280/731
5,924,725 A * 7/1999 Kozyreff et al. ............ 280/731
6,082,758 A * 7/2000 Schenck ................... 280/728.2
6,139,051 A * 10/2000 Fujita .......................... 280/731

FOREIGN PATENT DOCUMENTS

| DE | 44 30 588 | 10/1995 |
| DE | 296 06 322 | 8/1996 |
| EP | 0 756 973 | 2/1997 |
| GB | 2 262 591 | 6/1993 |
| GB | 2 270 657 | 3/1994 |
| GB | 2 290 267 | 12/1995 |
| GB | 2 292 353 | 2/1996 |
| JP | 08104197 | 4/1996 |

* cited by examiner

*Primary Examiner*—Daniel G. DePumpo
*Assistant Examiner*—David R. Dunn
(74) *Attorney, Agent, or Firm*—Foley & Lardner

(57) ABSTRACT

The invention relates to an array for activating the horn in built-in modular steering wheels, wherein the cover of the airbag that is placed on top of the air bag unit forms part of the steering wheel rim. According to the invention, the air bag unit (5) is fixed to at least one contact of the horn (17) that is connected thereto and is fixed to at least one section of the steering wheel (4). Said section is elastically deformable in the direction of the corresponding mating contact (18). The air bag unit (5) is placed preferably in an elastically deformable section of the air bag cover (2).

16 Claims, 1 Drawing Sheet

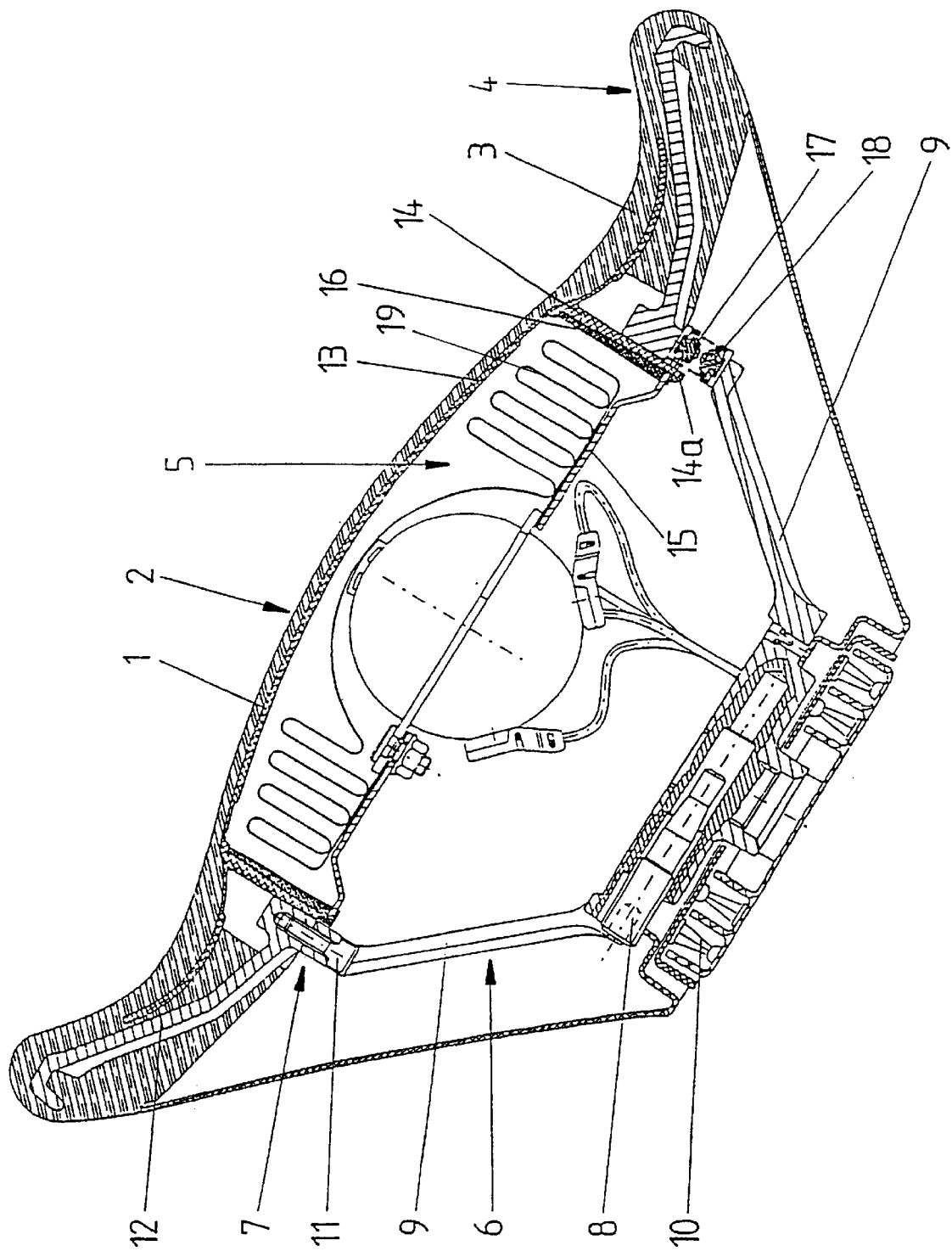

ARRAY FOR ACTIVATING THE HORN IN BUILT-IN MODULAR STEERING WHEELS

BACKGROUND OF THE INVENTION

The invention relates to an arrangement for operating the horn in built-in modular steering wheels.

With built-in modular steering wheels where the airbag cover lying above the airbag unit is a constituent part of the steering wheel rim the horn activation is undertaken via horn foils or separate horn switches. Thus, from German patent DE 296 06 322 U1, an airbag cover is known having horn foils that lie between a cover cap, which is elastically deformable at least in sections and a back wall, also known as back plate, opposite the folded gas bag. Two electrically conducting foils are thereby provided opposite and spaced from one another whereby their spacing is ensured through non-conducting spacers. These are arranged at such a distance from each other that the foils can contact one another through the action of pressure between the spacers whereby the horn is activated. The pressure action is through a horn button which is fixed on an elastically deformable section of the airbag cover. A support device is provided between the back wall and the fixedly mounted airbag unit and ensures that the upper foil adjoining the cover cap need only be pressed in up to a depth predetermined by the support device in order to contact the lower foil and thus trigger the horn process.

Although the reliability of the horn with this described arrangement was able to be improved compared to other known steering wheels, with horn foils there is still a certain risk that the horn foils contact one another accidentally and thus trigger a horn signal.

Furthermore, with steering wheels where the airbag module is provided with an airbag cover mounted separately from the steering wheel, it is known to mount the airbag unit movable and to attach to a contact to the airbag unit for activating the horn. By pressing on the airbag cover, the airbag unit is displaced and the contact is thereby pressed onto the counter contact so that the horn process is triggered.

SUMMARY OF THE INVENTION

The object of the invention is to improve the horn activation in the case of built-in modular steering wheels.

With an arrangement for activating the horn in built-in modular steering wheels where the airbag cover lying above the airbag unit is a constituent part of the steering wheel rim, it is proposed, according to the invention, that the airbag unit is fixed with at least one horn contact fixed thereon to at least one section of the steering wheel which is elastically deformable in the direction of the associated counter contact. More particularly, it is proposed that the airbag unit is attached on at least one elastically deformable section of the airbag cover.

Whereas, with built-in modular steering wheels the airbag units were previously mounted fixed and thus could not be used for operating the horn, this is now possible through the displaceability of the airbag unit. The displacement of the airbag unit takes place through the action of pressure on the airbag cover which is likewise elastically deformable. The reliability of the horn activation is thereby guaranteed in the same way as in the case of a displaceable airbag unit having an airbag cover that is separate from the steering wheel.

In one embodiment, the airbag cover and the adjoining steering wheel rim have an elastically deformable plastic insert which is provided with at least one connecting part for fixing a generator support of the airbag unit whereby the plastic insert is free of covering on the side facing the airbag unit from the center of the steering wheel up to beyond the connecting part, and the connecting part is likewise free of covering. The side of the airbag cover visible on the outside and the adjoining areas of the steering wheel are, however, provided in the usual way with an enveloping cover layer. A horn contact is fixed on the generator support and is associated with a counter contact. When pressing down the airbag cover the connecting part and thus the generator support with the horn contact is likewise pressed down in the direction of the counter contact underneath.

In order to achieve a sufficient stability for the steering wheel and still allow easy operation of the horn, it is preferable if the plastic insert has reduced thickness in the area of the connecting part compared to the remaining area.

It is expedient if the connecting part at the side adjoins the steering wheel skeleton frame and can be displaced opposite same. It is further expedient to form the connecting part as a closed ring.

In a further design, for transferring forces in the case of horn activation, the generator support can be provided with a circumferential generator support edge which, at the side, adjoins the connecting part and extends between the generator support and the plastic insert whereby the connecting part has at least one bearing support for the generator support. The circumferential generator support edge is preferably injection molded onto the generator support. In the event of horn activation the generator support is activated through the generator support edge. If the folded gas bag packet adjoins the plastic insert, the generator support can also be activated by the gas bag packet when the horn is activated.

In a second embodiment, it is proposed that the airbag cover is provided with an elastically deformable plastic insert which is enclosed by an elastic cover and has at least a connecting part on which the airbag unit is fixed. Whereas, the plastic insert in the case of the first embodiment is designed opposite the airbag unit without a cover, in the second embodiment the plastic inserts is completely enclosed. The displaceability of the connecting part opposite the steering wheel skeleton frame is in this embodiment possible through the elastic deformability of the cover.

The airbag cover and the steering wheel surface preferably have a continuous polyurethane covering.

The horn contact is preferably fixed on the generator support on the side of the connecting part remote from the airbag unit.

DESCRIPTION OF THE DRAWING

The invention will now be explained with reference to an embodiment shown in the drawings. FIG. 1 shows a sectional view through a built-in modular steering wheel.

DETAILED DESCRIPTION OF THE INVENTION

In FIG. 1, the surface of steering wheel 4 is formed continuous, i.e., the cover layer 1 of the airbag cover 2 and the cover layer 3 of the steering wheel 4 form one unit. In order to be able to mount an airbag unit 5 in a steering wheel of this kind, the steering wheel has to be designed in two parts in a known way. It, therefore, consists of a lower part 6 and an upper part 7. The lower part 6 comprises substantially the steering wheel hub 8 with the spokes 9 and a contact unit 10.

The upper part 7 is fixed, e.g., by means of screws 11 on the lower part 6. The upper part 7 substantially comprises the steering wheel skeleton 12 which is covered by the cover layer 3. An elastically deformable plastic insert 13 is provided in the cover layer 3 and has in the area of the airbag unit 5 a connecting part 14 which runs ring-shaped round the airbag unit and has support bearings 14a for a generator support 15 of the airbag unit 5. It can be seen that the plastic insert 13 is not encased by the cover layer 3 on the side which faces the airbag unit, both directly in the area of the airbag unit and outside of the connecting part. Also the connecting part 14 has no covering. It can be seen that the plastic insert 13 has in the area of the connecting part 14 a reduced thickness compared to the remaining areas. It is thereby easily possible to press down the airbag cover 2.

The generator support 15 is provided with an injection molded circumferential generator support edge 16 and rests on several support bearings 14a of the connecting part 14. The generator support edge 16 stretches between the generator support 15 and the plastic insert 13 and adjoins the connecting part 14. Thus, the generator support edge 16 can transfer the forces necessary to operate the horn contacts.

Outside the space provided for the airbag unit 5 and defined by the ring-shaped connecting part 14 an electrical contact 17 is provided on the generator support 15 and is associated with a counter contact 18 which is fixed on a spoke 9.

If pressure is applied in the middle onto the airbag cover 2, owing to the elastically deformable plastic insert, the airbag cover is pressed downwards, as well as in the area of the generator support edge 16. Since the connecting part is not connected to the steering wheel skeleton 12 it can be pressed down with the generator support edge 16. The generator support 15 and the contact 17 fixed thereon are also pressed down with the generator support edge 16 until the contacts 17, 18 are closed whereby the horn signal is released. The generator support 15 is thereby moved against a spring (not shown) which is provided between the generator support 15 and the steering wheel skeleton.

In the event that the folded gas bag packet 19 adjoins the plastic insert 13, the generator support is moved also by the gas bag packet when the horn is activated.

Since the spacing of the contacts is greater than the spacing of the foils used hitherto in the case of built-in modular steering wheels, the risk of accidental horn activation is less. On the other hand, through the choice of thickness of the plastic insert in the area of the connecting part it is possible to set the desired pressure strength which has to be exerted in order to activate the horn.

What is claimed is:

1. A built-in modular steering wheel comprising:
   a steering wheel rim;
   an airbag cover being a constituent part of the steering wheel rim;
   an airbag unit lying below the airbag cover, the airbag unit having at least one horn contact fixed thereon, and wherein the airbag unit is fixed on at least one elastically deformable section of the airbag cover, the section being deformable in a direction of an associated counter contact;
   an elastically deformable plastic insert, the insert having a first side adjoining the airbag cover and a second side facing the airbag unit;
   the insert provided with at least one connecting part supporting a generator support of the airbag unit;
   wherein the plastic insert is free of the airbag cover on the side facing the airbag unit from a center of the steering wheel outward to a point beyond the connecting part; and
   wherein the connecting part is free of the airbag cover.

2. A built-in modular steering wheel according to claim 1 wherein the airbag unit is attached to at least one elastically deformable section of the airbag cover.

3. A built-in modular steering wheel according to claim 1 wherein the plastic insert has a reduced thickness in an area adjacent the connecting part.

4. A built-in modular steering wheel according to claim 1 comprising a steering wheel skeleton adjacent the connecting part at a side of the connecting part, wherein the connecting part is displaceable opposite the steering wheel skeleton.

5. A built-in modular steering wheel according to claim 1 wherein the connecting part is formed as a closed ring.

6. A built-in modular steering wheel according to claim 1 comprising a generator support edge adjoining the connecting part, the generator support edge extending between the generator support and the plastic insert, wherein the connecting part has at least one support bearing for supporting the generator support.

7. A built-in modular steering wheel according to claim 6 wherein the generator support edge is injection molded on the generator support.

8. A built-in modular steering wheel according to claim 1 wherein the airbag cover and a surface of the steering wheel have a continuous cover of polyurethane.

9. A built-in modular steering wheel according to claim 1 wherein the connecting part has a side remote from the airbag unit and horn contact is fixed on the generator support on the side of the connecting part remote from the airbag unit.

10. A built-in modular steering wheel comprising:
    a steering wheel rim;
    an airbag cover being a constituent part of the steering wheel rim and having an elastically deformable portion;
    an airbag unit lying below the airbag cover, the airbag unit having a generator support and at least one horn contact fixed thereon, and wherein the airbag unit is fixed on at least one elastically deformable section of the steering wheel, the section deformable in a direction of an associated counter contact; and
    wherein the elastically deformable portion of the airbag cover further comprises an elastically deformable plastic insert; and wherein the airbag cover has at least one connecting part on which the airbag unit is fixed.

11. A steering wheel, comprising:
    a steering wheel skeleton;
    an airbag cover having a cover layer covering the steering wheel skeleton and an elastically deformable plastic insert; integral with the cover layer, the airbag cover having at least one elastically deformable section;
    an airbag unit lying below the airbag cover;
    an annular connecting part positioned around the airbag unit, the connecting part having an inner surface facing the airbag unit, an outer surface facing away from the airbag unit; and
    a contact responsive to the deformation of the plastic insert wherein the contact moves toward a counter contact when the plastic insert is deformed in the direction of the airbag unit; and wherein the elastically deformable plastic insert has a first side facing the cover layer and a second side facing the airbag unit.

12. The steering wheel of claim 11, comprising a generator support resting on a plurality of support bearings of the connecting part, wherein the contact is fixed on the generator support.

13. The steering wheel of claim 12 further comprising a generator support edge positioned between the generator support and the plastic insert, the generator support edge adjoining the connecting part.

14. The steering wheel of claim 13 wherein the generator support edge is formed as a closed ring.

15. The steering wheel of claim 11 wherein the counter contact is fixed on a spoke of the steering wheel in a facing relationship to the contact.

16. The steering wheel of claim 11 wherein the plastic insert has a reduced thickness in an area adjacent to the connecting part.

* * * * *